United States Patent
Horvitz et al.

(10) Patent No.: US 8,909,546 B2
(45) Date of Patent: Dec. 9, 2014

(54) PRIVACY-CENTRIC AD MODELS THAT LEVERAGE SOCIAL GRAPHS

(75) Inventors: Eric J. Horvitz, Kirkland, WA (US); Brett D. Brewer, Sammamish, WA (US); Mary P. Czerwinski, Woodinville, WA (US); Melissa W. Dunn, Woodinville, WA (US); Karim T. Farouki, Seattle, WA (US); Jason Garms, Woodinville, WA (US); Alexander G. Gounares, Kirkland, WA (US); Milind V. Mahajan, Redmond, WA (US); Jayaram NM Nanduri, Sammamish, WA (US); Timothy D. Sharpe, Redmond, WA (US); Darrell Leroy Blegen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1308 days.

(21) Appl. No.: 12/492,569

(22) Filed: Jun. 26, 2009

(65) Prior Publication Data
US 2009/0265242 A1    Oct. 22, 2009

Related U.S. Application Data

(63) Continuation-in-part of application No. 11/767,360, filed on Jun. 22, 2007, now abandoned.

(60) Provisional application No. 60/870,926, filed on Dec. 20, 2006.

(51) Int. Cl.
*G06Q 30/00*  (2012.01)
*H04L 29/06*  (2006.01)
*G06Q 30/02*  (2012.01)
*H04L 29/08*  (2006.01)

(52) U.S. Cl.
CPC .......... *H04L 63/104* (2013.01); *G06Q 30/0254* (2013.01); *H04L 67/22* (2013.01); *H04L 67/306* (2013.01); *G06Q 30/0277* (2013.01); *G06Q 30/02* (2013.01)

USPC .................. 705/14.64; 705/14.66; 705/14.67; 705/14.49; 705/14.53; 705/14.58; 705/14.4; 705/1; 705/8; 705/10; 709/203; 709/218; 709/224; 709/226; 709/228; 707/769; 707/100

(58) Field of Classification Search
USPC .......... 705/14.64, 14.66, 14.67, 14.49, 14.53, 705/14.58, 1, 8, 10; 707/769; 709/218, 224, 709/226, 228
See application file for complete search history.

(56) References Cited

U.S. PATENT DOCUMENTS
7,337,127 B1    2/2008  Smith et al.
7,373,389 B2    5/2008  Rosenbaum et al.
(Continued)

FOREIGN PATENT DOCUMENTS
WO    WO2006038036 A    4/2006
WO    WO2008147919 A1   12/2008

OTHER PUBLICATIONS
Cox, Landon P. Dalton, Angela. Marupadi, Varun. "Smokescreen: Flexible Privacy Controls for Presence-Sharing." Department of Computer Science, Duke University, Jun. 14, 2007.*

(Continued)

*Primary Examiner* — Luis A Brown
(74) *Attorney, Agent, or Firm* — Doug Barker; Dave Ream; Mickey Minhas

(57) ABSTRACT

The claimed subject matter relates to an architecture that can mitigate privacy concerns in connection with ad targeting or data collection. In particular, architecture can be included in a personal mobile communication device such as a cell phone. During communication transactions between the host device and a peer device, shared information can be extracted either from content included in the communication or from metadata. Based upon the shared information, a social graph maintained on the host device can be updated. In addition, the host device can receive a large set of ads and select or tailor a custom ad from the set based upon the social graph.

19 Claims, 11 Drawing Sheets

(56) References Cited

U.S. PATENT DOCUMENTS

| | | | |
|---|---|---|---|
| 7,519,542 B1* | 4/2009 | Waingold | 705/7.11 |
| 7,599,852 B2* | 10/2009 | Bosarge et al. | 705/14.49 |
| 7,610,390 B2* | 10/2009 | Yared et al. | 709/229 |
| 7,630,986 B1* | 12/2009 | Herz et al. | 1/1 |
| 8,265,606 B2* | 9/2012 | Ghotge et al. | 455/414.1 |
| 2002/0123928 A1* | 9/2002 | Eldering et al. | 705/14 |
| 2003/0120928 A1* | 6/2003 | Cato et al. | 713/176 |
| 2003/0187733 A1* | 10/2003 | Hertling et al. | 705/14 |
| 2004/0059712 A1* | 3/2004 | Dean et al. | 707/1 |
| 2004/0194128 A1 | 9/2004 | McIntyre et al. | |
| 2005/0165640 A1* | 7/2005 | Kotorov | 705/14 |
| 2006/0282309 A1* | 12/2006 | Zhang et al. | 705/14 |
| 2007/0016921 A1* | 1/2007 | Levi et al. | 725/35 |
| 2007/0027765 A1 | 2/2007 | Collins et al. | |
| 2007/0233571 A1* | 10/2007 | Eldering et al. | 705/14 |
| 2008/0004884 A1 | 1/2008 | Flake et al. | |
| 2008/0004954 A1 | 1/2008 | Horvitz | |
| 2008/0004957 A1 | 1/2008 | Hildreth et al. | |
| 2008/0005073 A1* | 1/2008 | Meek et al. | 707/3 |
| 2008/0052168 A1 | 2/2008 | Peters et al. | |
| 2008/0052741 A1 | 2/2008 | Dharmaji | |
| 2008/0070593 A1 | 3/2008 | Altman et al. | |
| 2008/0140476 A1 | 6/2008 | Anand et al. | |
| 2008/0195460 A1 | 8/2008 | Varghese | |
| 2008/0227385 A1* | 9/2008 | Bappu et al. | 455/3.06 |
| 2008/0243780 A1* | 10/2008 | Nance et al. | 707/3 |
| 2008/0287150 A1* | 11/2008 | Jiang et al. | 455/466 |
| 2009/0011781 A1* | 1/2009 | Merrill et al. | 455/466 |
| 2009/0016524 A1 | 1/2009 | Park et al. | |
| 2009/0031232 A1* | 1/2009 | Brezina et al. | 715/764 |
| 2009/0061862 A1* | 3/2009 | Alberth et al. | 455/434 |
| 2009/0198711 A1* | 8/2009 | Datar et al. | 707/7 |
| 2009/0203359 A1* | 8/2009 | Makhoul et al. | 455/412.2 |
| 2009/0265242 A1* | 10/2009 | Horvitz et al. | 705/14.52 |
| 2010/0041422 A1* | 2/2010 | Wormald et al. | 455/466 |
| 2010/0082427 A1* | 4/2010 | Burgener et al. | 705/14.49 |
| 2010/0082695 A1* | 4/2010 | Hardt | 707/798 |
| 2010/0167709 A1* | 7/2010 | Varadarajan et al. | 455/414.3 |
| 2010/0169364 A1* | 7/2010 | Hardt | 707/769 |
| 2010/0174726 A1* | 7/2010 | Nance et al. | 707/750 |
| 2010/0180001 A1* | 7/2010 | Hardt | 709/207 |
| 2010/0185507 A1* | 7/2010 | Tokuda | 705/14.41 |
| 2010/0228582 A1* | 9/2010 | King et al. | 705/7 |
| 2010/0250330 A1* | 9/2010 | Lam et al. | 705/10 |
| 2010/0257023 A1* | 10/2010 | Kendall et al. | 705/10 |
| 2010/0268830 A1* | 10/2010 | McKee et al. | 709/228 |
| 2010/0279667 A1* | 11/2010 | Wehrs et al. | 455/414.1 |
| 2010/0293247 A1* | 11/2010 | McKee et al. | 709/218 |
| 2010/0312619 A1* | 12/2010 | Ala-Pietila et al. | 705/14.1 |
| 2010/0318919 A1* | 12/2010 | Murphy et al. | 715/745 |
| 2010/0324704 A1* | 12/2010 | Murphy et al. | 700/94 |
| 2011/0022461 A1* | 1/2011 | Simeonov | 705/14.49 |
| 2011/0055930 A1* | 3/2011 | Flake et al. | 726/27 |
| 2011/0276396 A1* | 11/2011 | Rathod | 705/14.49 |

OTHER PUBLICATIONS

Morgan. The Holy Grail of Marketing: A Traditional Marketer's Guide to Interactive Marketing http://www.actuan.com/whitepapers/TheHolyGrailOfMarketing.pdf. Last accessed Sep. 3, 2008, 8 pages.

E-Metrics—Business Metrics for the New Economy http://www.targeting.com/emetrics.pdf. Last accessed Sep. 3, 2008, 67 pages.

Novak, et al. New Metrics for New Media: Toward the Development of Web Measurement Standards, Sep. 26, 1996. In: World Wide Web Journal, Winter, 2(1), 213-246. http://sloan.ucr.edu/blog/uploads/papers/New%20Metrice%20for%20New%20Media_%20Toward-%20the%20Development%20of%20Web%20Measurement%20-Standar.pdf. Last accessed Sep. 3, 2008, 30 pages.

Gedik. Protecting Location Privacy with Personalized k-Anonymity: Architecture & Algorithms. IEEE Transactions on Mobile Computing Jan. 2008 vol. 17 No. 1, 18 pages.

\* cited by examiner

PRIVACY-CENTRIC AD MODELS THAT LEVERAGE SOCIAL GRAPHS

CROSS-REFERENCE TO RELATED APPLICATIONS

This application is a continuation-in-part of and claims the benefit of U.S. application Ser. No. 11/767,360, filed on Jun. 22, 2007 now abandoned, entitled "MOBILE AD SELECTION AND FILTERING," which claims the benefit of U.S. Provisional Application Ser. No. 60/870,926, filed Dec. 20, 2006, entitled "ARCHITECTURES FOR SEARCH AND ADVERTISING." This application is related to U.S. patent application Ser. No. 12/487,020, filed on Jun. 18, 2009, entitled, "CORRELATING PRIVATE AFFINITIES." The entireties of these applications are incorporated herein by reference.

BACKGROUND

With the meteoric rise of Internet users, advertisers are continually looking for new ways to reach these users with advertisements. Unfortunately, while it is very easy to deliver mass advertisements (e.g., SPAM) by way of Internet advertising, such advertisements are often not relevant to a user since the advertiser may have no information about the user other than an email address. Oftentimes, these advertisements are viewed as annoyances and commonly filtered by way of a SPAM filter mechanism. In a similar domain, mobile device users have seen more recent growth, for which advertisers are very keen to tap in suitable ways. For example, advertisements that are tailored in some way for a user are generally less of an annoyance and may in fact be desired, however, tailoring an advertisement requires information associated with the user that is often difficult to obtain since most users are very distrustful about providing personal or private information to third party advertisers.

Thus, there has historically been a continuous struggle between consumers and third party advertisers with respect to sharing information. As described, on the one hand, by acquiring information relating to the consumer, third parties advertisers can tailor ads or other solicitations to be appropriate for the consumer, which, ultimately, can be beneficial for all parties involved. However, on the other hand, advertisers always want to reach consumers, yet oftentimes a consumer does not want to be bothered by the advertiser. Thus, many consumers simply refuse to sanction any sort of information sharing that might lead to unsolicited, unwanted, or inappropriate solicitations.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can that facilitates sharing of potentially sensitive information among a trusted network in order to mitigate privacy concerns in connection with ad profiling. In accordance therewith and to other related ends, the architecture can be included in a mobile communication host device such as, e.g., a cell phone or Personal Digital Assistant (PDA). The architecture included in the host device can extract shared information from a communication transaction between the host device and a peer device. Based upon this extracted shared information, a social graph can be updated accordingly. In addition, a set of advertisements can be received, and based upon this set, a custom ad can be selected or tailored on the host device in a privacy centric manner. The selection or tailoring can be based upon acute context information included in the social graph that generally would not be available to advertisers.

Appreciably, shared information can also be transmitted to the peer device from the host device. Thus, information of a potentially sensitive type can be securely transmitted and stored among a community that is as selective or as broad as desired, and the entire community can be the subject of unique marketing opportunities. In particular, information that could be useful for ad tailoring, yet which is not desired to be accessed by the advertiser, but that can be shared among friends or family or other trusted circles. For example, the architecture can construct nodes of the social graph by examining contact lists and/or communication logs, and then populate those peer nodes with shared information. Moreover, all information in the social graph can be tagged as either public, trusted, or private in order to define access rights, which can be performed in whole or in part automatically and/or with express input from a user.

In addition, even though the fine-level customization of ads can be done on the host device in order to maintain data privacy, certain public or less sensitive information can be shared with an ad host to, e.g. enable the ad host to select a contextually relevant set of advertisements to deliver to the host. Moreover, while an ad host typically only has access to public information, determining which public information to provide to that ad host can be performed on the host device, and can therefore utilize trusted or private information in making the determination or inference. Moreover, assuming informed consent is provided or another form of authorization, certain trusted or private information can be anonymized or undergo various transformations to become public information. As one example, personally identifying information (e.g., name, address, social security number . . . ) can be removed from trusted or private data in order to transform to public data. As another example, noise provided by way of, e.g. epsilon differential or other techniques, can be added to trusted or private information data sets in order to preserve privacy.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
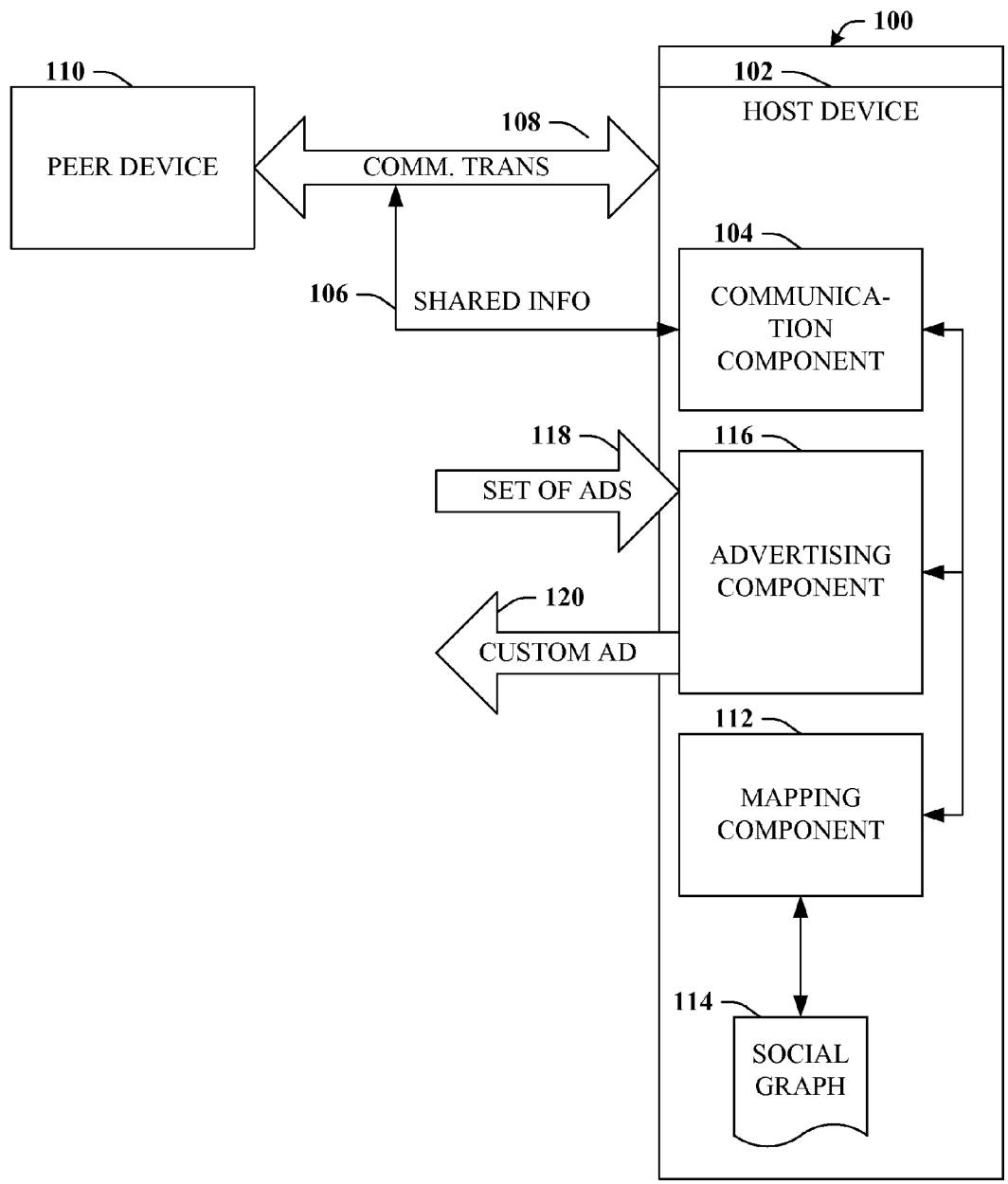
FIG. 1 illustrates a block diagram of a system that can mitigate privacy concerns in connection with ad targeting or data collection.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, system 100 that can mitigate privacy concerns in connection with ad targeting or data collection is depicted. Generally, system 100 can include mobile communication host device 102 typically a cell phone or smart phone. However, it is to be appreciated that the host device 102 can be substantially any mobile/portable electronic device such as laptops, tablets, media players/recorders, Personal Digital Assistants (PDA), cameras, games, fobs, and so on. Host device 102 can be a handheld device as well as wearable device and generally includes suitable hardware for one or more types of wireless communication such as cellular, wireless fidelity (WiFi-IEEE 802.11x specifications), Bluetooth (IEEE 802.15.x specifications), Near Field Communication (NFC), Radio Frequency Identification (RFID), etc.

Furthermore, host device 102 can include communication component 104 that can extract shared information 106 from communication transaction 108 that occurs between host device 102 and peer 110. As with host device 102, peer device 110 will often be a mobile communication device, such as a cell phone or the like. Hence, communication transaction 108 can represent communication in substantially any form such as, e.g., a phone call, a text message, a media-based message, or an email to name but a few examples. Shared information 106 can be configured as metadata that is embedded in or transmitted with communication transaction 108 and extracted by communication component 104. However, shared information 106 can be obtained by communication component 104 in other ways, which is further detailed in connection with FIG. 2.

Host device 102 can also include mapping component 112 that can update social graph 114 based upon shared information 106 received from peer device 110, as explained in more detail with reference to FIGS. 3-4. As depicted, social graph 114 can be maintained on host device 102, which therefore provides a degree of security or privacy. For example, data included in social graph 114 can be securely stored and/or not accessible by unwanted or unauthorized third parties.

In addition, host device 102 can further include advertising component 116 that can receive set 118 of advertisements. Set 118 can be received from, e.g., an ad host or data center that hosts advertisements for one or more advertisers; or received from some other source. Advertising component 116 can select custom ad 120 from among advertisements included in set 118 based upon information included in social graph 114. Additionally or alternatively, advertising component 116 can select, then further tailor the selected ad based upon social graph 116 to produce custom ad 120, which is further discussed in connection with FIG. 5.

Moreover, advertising component 116 can generate custom ad 120 in a privacy-centric manner, which, as used herein is intended to mean utilizing information locally on a personal device, using privacy- or anonymity-enhancing data transformations, and/or utilizing information that is not available to or not authorized for sharing with an advertiser, an ad host, a data center, or potentially any third party. Appreciably, much information that is especially useful or relevant to an advertiser for customizing advertisements to suit a particular individual is often considered by individuals to be personal or private information. Hence, individuals generally refuse to share, or in fact do not want advertisers to know, such potentially sensitive information in spite of the fact that highly relevant and contextually appropriate ads can be quite desirable to those individuals.

Accordingly, by receiving a broad set 118 of advertisements on a personal device (e.g., host device 102), actual ads authorized by an advertiser can be customized or selected specifically for an individual in minute detail, based upon information about that individual he or she is not willing to disseminate to the advertiser. Moreover, mobile devices such as host device 102 provide an additional benefit in that mobile devices are particularly well suited to identify or understand a user's context and behavior in real-time and essentially at any location. Thus, by accessing information that is available on host device 102 (and potentially nowhere else), advertising component 116 can leverage acute contextual and behavioral information, all without exposing sensitive information to any third party.

Additional aspects, features, or details of the components included in system 100 and/or host device 102 and other related information can be found in connection with FIGS. 2-5 below, which are intended to be inspected in conjunction with FIG. 1. In particular, FIG. 2 relates generally to communication component 104 and communications involving host device 102 and peer device 110. FIGS. 3 and 4 generally relate to mapping component 112 and social graph 114, whereas FIG. 5 relates more specifically to advertising component 116 and advertisements.

Figure 2:
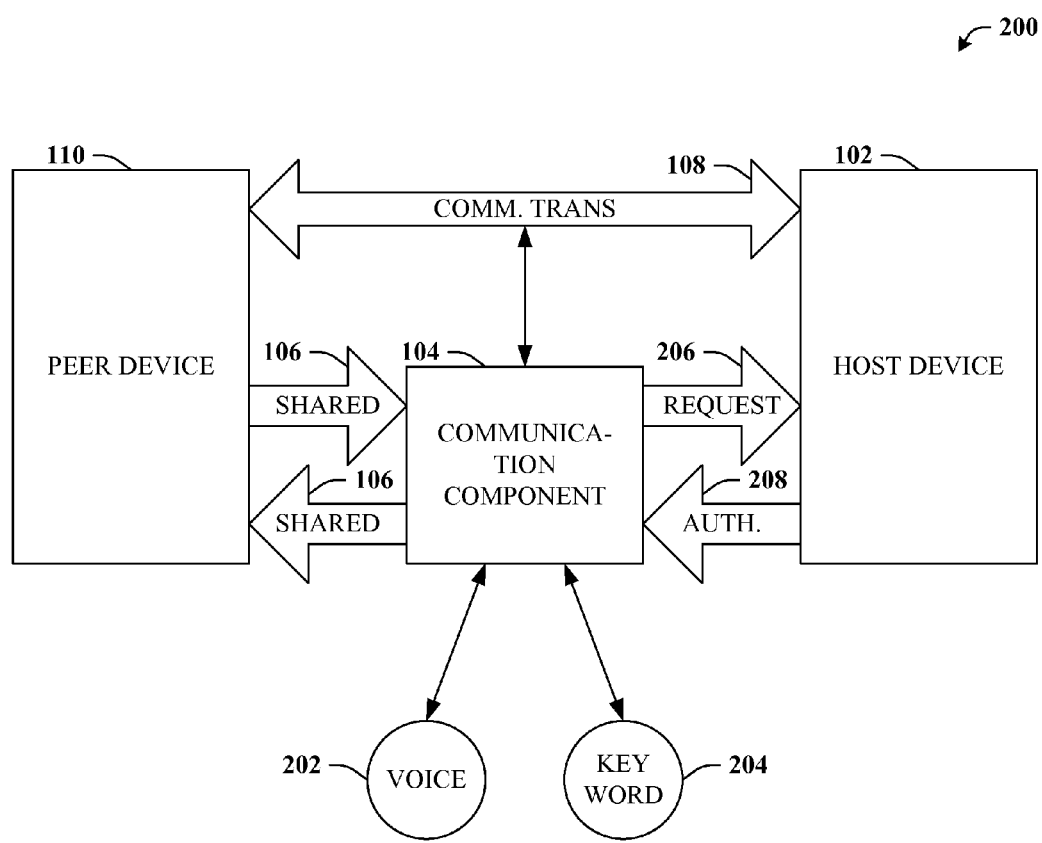
FIG. 2 depicts a graphical block diagram that can facilitate dissemination of shared information among trusted parties.

Turning now to FIG. 2, system 200 that can facilitate dissemination of shared information among trusted parties is illustrated. In general, system 200 can include host device 102 that can be substantially any suitable mobile communication device as detailed supra. In addition, system 200 can include communication component 104 that can extract shared information 106 from communication transaction 108 between host device 102 and peer device 110, as indicated previously. Typically, communication component 104 will be included in host device 102, but is depicted here as a distinct entity substantially for illustrative purposes, e.g. to illustrate various internal communication with host device 102.

In one or more aspects of the claimed subject matter, trusted information 106 can be delivered to or received from peer device 110 as metadata substantially during communication transaction 108 that occurs between host device 102 and peer device 110. Additionally or alternatively, communication component 104 can employ voice recognition technique 202 or keyword recognition technique 204 in order to extract shared information 106 from content included in communication transaction 108. For example, setting aside for the time being some discussions of privacy concerns, which will be detailed further infra, consider two friends, Ashley and Ross. Ross, by way of peer device 110 sends a text message (e.g., communication transaction 108) to Ashley (by way of host device 102), stating, "I'm at Times Square." Based upon keyword recognition techniques 204, communication component 104 can extract location information as shared information 106. Likewise, substantially similar shared information 106 can be extracted by communication component 104 had the communication been, say, a telephone call with the same words spoken rather than typed. Such can be accomplished by utilizing voice recognition techniques 202, potentially in connection with keyword recognition techniques 204. Of course, location information from Global Positioning Satellite (GPS) units or other location-based mechanisms included in peer device 110 can be transmitted as shared information 106 to host device 102, e.g., as metadata embedded in Ross's text message or phone call to Ashley, even if the communication is about another matter entirely.

Regardless of how such shared information 106 (e.g., Ross's current location) is obtained, this data can be quite useful for contextually tailoring ads or incentives yet, at the same time, is probably something Ross would not want an advertiser to know. On the other hand, Ross normally would not mind if his friends or other trusted parties are privy to this information. In fact, in two of the above examples, Ross expressly told Ashley his current location, so no privacy issues arise with Ashley receiving this data. Thus, it should be appreciated, that in terms of privacy, information obtained by way of recognition techniques 202, 204, or other suitable techniques can attain an implicit authorization of trust given the express communication to host device 102.

In one or more aspects of the claimed subject matter, communication component 104 can transmit shared information 106 associated with host device 102 to peer device 110 when authorized to do so. For example, suppose Ashley is window shopping in Times Square and calls her friend Ross to inquire about the restaurant he recommended. Prior to, or slightly after Ashley hangs up, communication component 104 can transmit request 206 that indicates, e.g. "Is it OK to share your location data with Ross?" If Ashley agrees, then authorization 208 can be provided to communication component 104, and the associated shared information 106, possibly based upon GPS information available to Ashley's phone, can be transmitted to Ross.

It should be understood that the above examples are intended to be elementary in nature in order to facilitate an understanding of the scope and spirit of the claimed subject matter. Numerous other applications are contemplated and will become more apparent with subsequent discussion. Moreover, while location information has been thus far the primary example of shared information 106, it should be appreciated that other types of data are suitable. For instance, shared information 106 can be, e.g. a social graph or portions thereof, location information or a history thereof, a purchase history, a browse history, a click history, an ad receipt history, a device use history, or a device status or history thereof. Appreciably, with such rich data readily available to trusted sources, these trust networks can leverage comprehensive profiling techniques, potentially even community-wide, yet do so internally in a privacy-centric manner, and also in a manner that can be entirely customizable both in terms of profiling and in terms of privacy.

Figure 3:
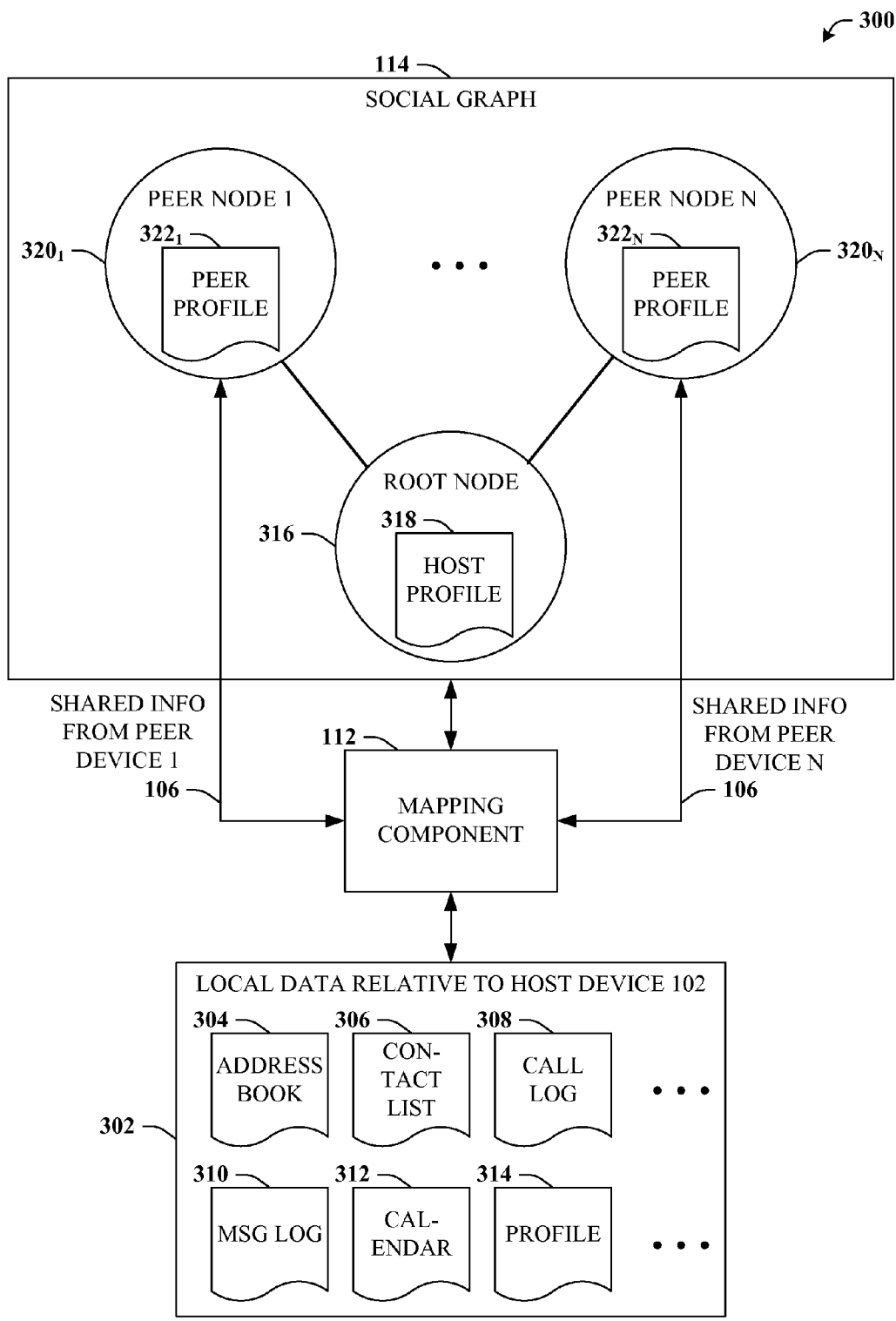
FIG. 3 provides a block diagram of a system that can generate a social graph from local data.

Referring now to FIG. 3, system 300 that can generate a social graph from local data is provided. In particular, system 300 can include mapping component 112 that, in addition to the features detailed supra, can further construct or update social graph 114 based upon, e.g., an examination of local data 302. Local data 302 can be stored on host device 102 substantially in a privacy-centric matter, and can be for example, address book 304 or contact list 306. For instance, a listing of stored telephone numbers or email addresses of those with whom a user has communicated with by way of host device 102, potentially including various characteristics of hierarchy or classification (e.g., family, friends . . . ). Similarly, local data 302 can include call log 308, message log 310, or another communication log, potentially including time, frequency, length/duration, or other statistics relating to past communication transactions. Furthermore, local data 302 can include a schedule, to-do list, diary, agenda, calendar 312 or the like; as well as one or more personal profiles 314, potentially relating to host device 102, other applications or components included in host device 102, or even in some cases disparate profiles that are accessible by host device 102 (e.g., online profiles).

Profile 314 can include a variety of information relating to host device 102 and/or a user thereof, such as that which is expressly described herein as well as other information suitable for or within the spirit of the claimed subject matter. For example, profile 314 can include preferences, settings, or defaults; a current or recent location of host device 102 or a history thereof; a current or recent transaction (e.g., a purchase, an encounter, a charitable donation, a rating, review, or other feedback . . . ) or a history of transactions; a browse history, a click history, a history of previously received ads or other shared information 106, or a device status or history thereof Profile 314 can also include demographic data associated with a user of host device 102 such as age, gender, income, race, residence, or the like. In addition, profile 314 can include or access data relating to hobbies, interests, viewpoints, or essentially any available information that is suitable for use in connection with the appended claims.

In one or more aspects, mapping component 112 can construct root node 316 for social graph 114 that substantially represents host device 102 (or a user thereof) in social graph 114. Root node 316 can include host profile 318 that can be associated with host device 102 or a user thereof. Host profile 318 can be populated with information included in one or more personal profiles 314, or populated incrementally over time with information that is substantially similar to that which has been described in connection with personal profile 314, or with information that is otherwise suitable. For example, information that is directed toward context, behavior, activities, personality, habits, likes, interests, relationships or other social attributes and so forth.

Additionally, mapping component 112 can add to social graph 114 one or more peer nodes $320_1$-$320_N$, referred to herein either collectively or individually as peer node(s) 320 with specific subscripts generally utilized only when necessary to appropriately distinguish or to avoid confusion. Peer nodes 320 can relate to a peer device 110 that is in some manner known or addressable by host device 102, for example obtained from local data 302. Hence, mapping component 112 can add a peer node 320 for each member of address book 304 or contact list 306, or based upon other local data 302. Mapping component 112 can then construct an edge between the newly added peer node 320 and root node 316. In one or more aspects, mapping component 112 can add peer node 320 if and only if a certain threshold level of communication transactions 108 occurs between host device 102 and peer device 110. For instance, a one-time call or caller that shows up in call log 308 need not necessarily result in an associated peer node 320. Rather, peer node 320 can be constructed only when, say, three or more communication transactions 108 occur within, say, 30 days. Appreciably, any such threshold level can be overridden such as, e.g., creating a node for a distant relative even though communication transactions 108 occur quite infrequently.

The threshold level can be based upon a predefined or subsequently determined default, or based upon a customizable setting. Moreover, peer nodes 320 can be substantially permanent (e.g., once created they remain in social graph 114) or not (e.g., audited periodically to ensure the threshold level is satisfied). In the latter case, it should be understood that any information associated with a removed peer node 320 can be stored for later use. For instance, drawing from the previous example, suppose Ashley exchanges numerous communication transactions 108 with Ross over the course of a month, yet the following month there are none, so Ross's peer node 320 then fails to meet the threshold level and is removed from social graph 114. However, the following month communication transactions 108 pick up once more, and Ross's peer node 320 is again added to social graph 114. In such a case, the previously accumulated data associated with Ross's peer node 320 can be retrieved and applied once more to that peer node 320.

Such information can be, e.g., peer profiles $322_1$-$322_N$, one for each peer node 320. Peer profile 322 can be substantially similar to host profile 318, yet it is contemplated that host device 102 will not always have access to the same level or detail of information that is available for the a user thereof. For example, Ashley's phone is likely to have access to much more information relating to Ashley than to information relating to Ross, whereas the converse is typically true of Ross's phone. However, mapping component 112 can populate peer profile 322 with shared information 106 received from the associated peer device 110. For instance, Ross may not want an advertiser knowing his purchase history, browse history, or the like, but may not mind if Ashley receives this or similar information.

Figure 4:
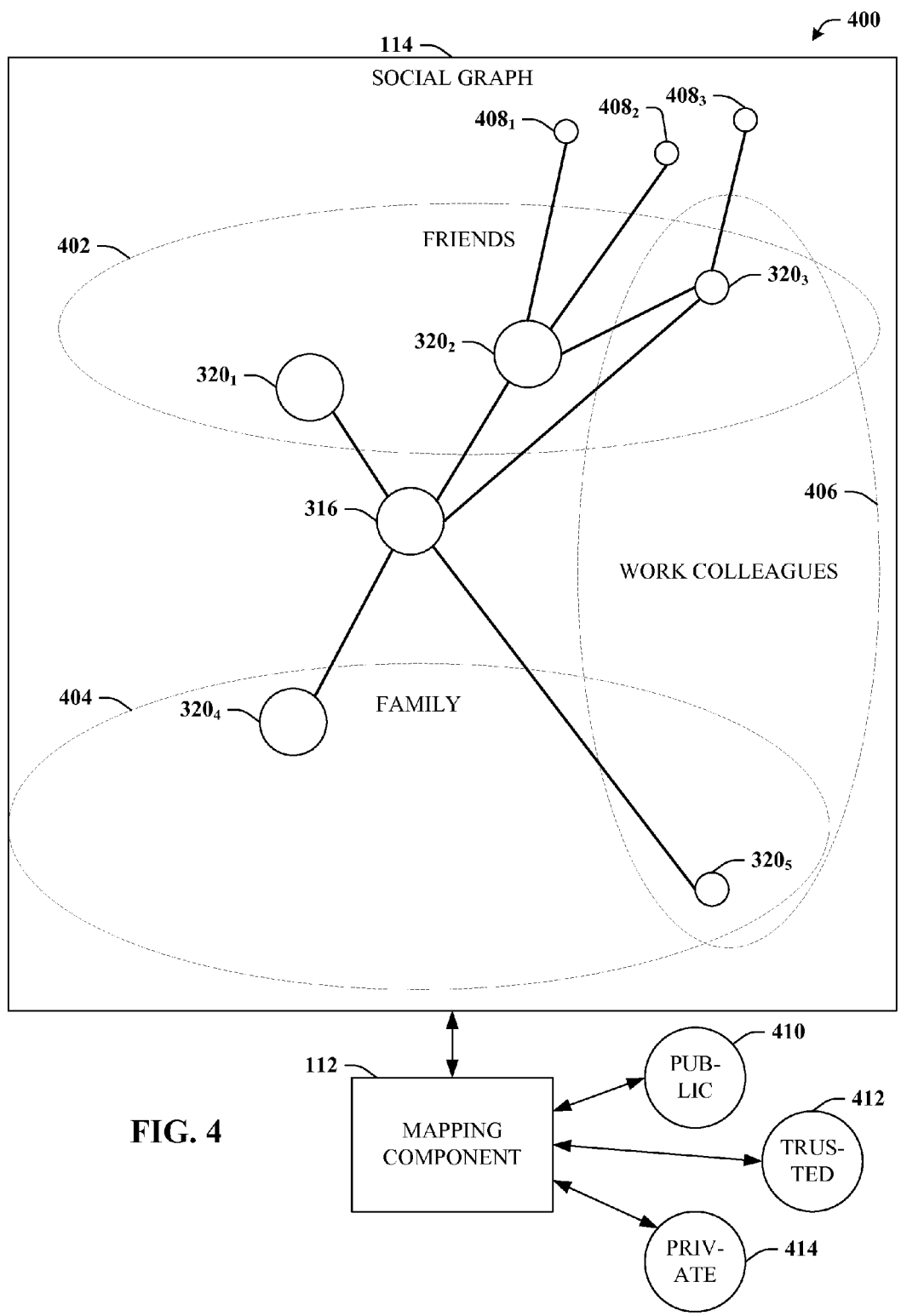
FIG. 4 is a block diagram of a system that illustrates additional features in connection with mapping component 112.

Turning now to FIG. 4, system 400 that illustrates additional features in connection with mapping component 112. In particular, as previously detailed, mapping component 112 can construct and/or update social graph 114. As depicted here, social graph 114 can include at least one of a frequency dimension, a relationship dimension, or a hierarchy dimension. The frequency dimension can relate to the number of communication transactions 108 that occur between peer node 320 and root node 312 in a particular period of time. This feature is visually depicted on social graph 114 based upon relative size of peer nodes $320_1$-$320_5$ and/or based upon distance from root node 312. Similarly, the relationship dimension can relate to a classification of the relationship of a given peer node 320 with respect to root node 312. For example, a peer node can be classified as a friend 402 (e.g. peer nodes $320_1$-$320_3$), as family 404 (e.g., peer nodes $320_4$-$320_5$), as a colleague 406 to name but a few examples. It is, of course possible for a given peer node to be classified under more than one relationship category, as is the case with peer nodes $320_3$ and $320_5$.

Likewise, the hierarchy dimension can relate to second degree relationships (e.g. friends of friends) or beyond, which is represented on social graph 114 as peer nodes $408_1$-$408_3$. Appreciably, peer nodes $408_1$-$408_3$ are generally not included in local data 302, however, they can be included when, e.g. other peer nodes 302 share their own social graphs (or certain information included therein) with host device 102 as shared information 106. Moreover, in keeping with an overriding and/or customizable theme of privacy, whenever host device 102 provides shared information 106 with peer device 110, communication component 104 can distinguish the level of hierarchy with which information is authorized to be shared.

For example, Ashley may only want her own friends (e.g. Ross) to be privy to certain information in some cases, while in other cases she might not mind if Ross and all his friends/contacts are privy to that information, or perhaps contacts only out to the third degree. Again, these distinctions can be accomplished by way of request 206 and authorization 208. Appreciably, trusted communities can be created that maintain and share rich sets of information that can be beneficial for a variety of applications, yet is maintained in a privacy-centric manner. One such application can be privacy-centric ad customization, which is further detailed in connection with FIG. 5. Of course, other applications are possible as well. For instance, consider the situation in which Ross shares with Ashley information (e.g., location information, a purchase history . . . ) relating to his recent outing at a renowned Italian restaurant. In that case, Ashley's social graph 114 or a profile associated with Ashley (e.g., profile 314) can be updated to reflect the fact that Ashley has a friend that likes Italian food, or who eats at that that particular restaurant, which can be interesting or significant data whether or not a reference to Ross's identity is included.

In one or more aspects of the claimed subject matter, mapping component 112 can classify information included in social graph 114 into a distinct access category. The distinct access category can be, e.g. public information 410, which has no restriction on dissemination beyond a trusted network defined by social graph 114. The distinct access category can also be trusted information 412 in which dissemination is restricted at least to a trusted network defined by social graph 114 or a portion thereof. For example, trusted information 412 can constitute information that can be disseminated in the form of shared information 106. Furthermore, the distinct access category can be private information that is not disseminated and is only available to host device 102.

Figure 5:
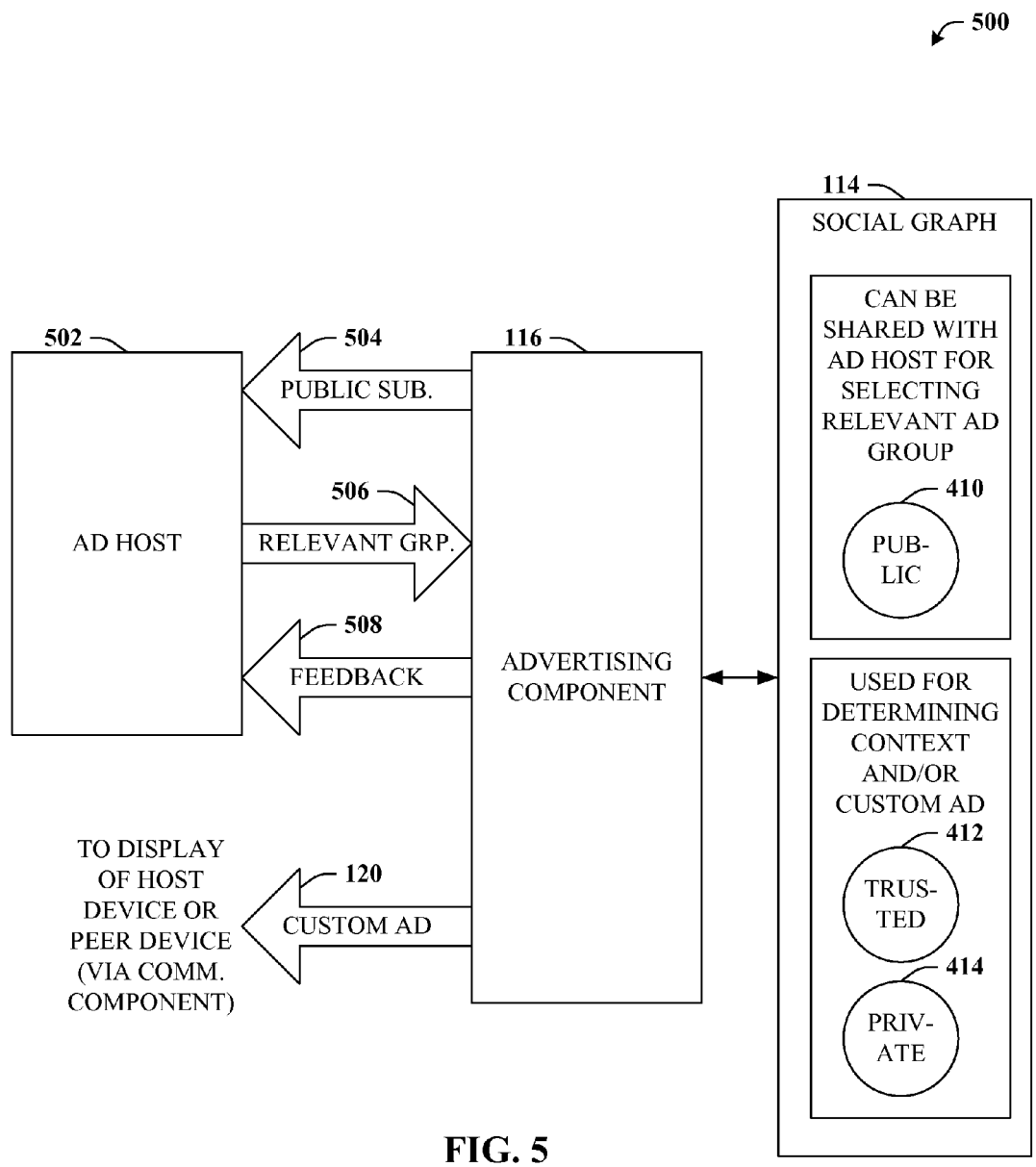
FIG. 5 depicts a block diagram of a system that illustrates additional features in connection with advertising component 116.

With reference to FIG. 5, system 500 that illustrates additional features in connection with advertising component 116. Generally, system 500 can include advertising component 116 that can receive set 118 of advertisements and select or tailor custom ad 120 in a privacy-centric manner as substantially described supra. In addition, advertising component 116 can examine public information 410 included in social graph 114 and can transmit to ad host 502 a subset 504 of public information 410. Ad host 502 can be substantially any provider of advertisements or data center related thereto, and can be the source of set 118 that is delivered to advertising component 116 as discussed in connection with FIG. 1.

In particular, in accordance with the claimed subject matter, ad host 502 is generally not privy to potentially sensitive information about host device 102 or an associated user or any information that user chooses to keep hidden. Rather, ad host 502 can ship large amounts of advertisement to host device 102, where those ads can be selected based upon very detailed criteria and context not shared with others. However, in many cases, there can be information (e.g., public information 410) that is not particularly sensitive or that a user does not mind sharing with one or more ad host 502. Moreover, assuming informed consent is provided or another form of authorization, certain trusted information 412 or private information 414 can be anonymized or undergo various transformations to become public information 410. As one example, personally identifying information (e.g., name, address, social security number . . . ) can be removed from more sensitive data in order to transform trusted information 412 or private information 414 to public information 410. As another example, noise provided by way of, e.g. epsilon differential or other techniques, can be added to data sets relating to trusted information 412 or private information 414 in order to preserve privacy.

While public information 410 may not be particularly relevant for finely crafting tailored and contextually relevant advertisements, such data can be employed to select a more relevant group 506, class, or type of ads to deliver to advertisement component 116 (as set 118). For instance, suppose subset 504 relates to the birthday of one of Ashley's friends, which happens to be later in the current month. This piece of data can be employed by ad host to select a group 506 of advertisements that are relevant for birthday gifts for friends. From that set of ads, advertising component 116 can determine what is most appropriate based upon, e.g., a previous history of gifts between the two parties, the nature of the friendship, Ashley's budget, businesses or specials near Ashley's current location and so forth.

In addition, advertising component 116 can select subset 504 of public information 410 to be delivered to ad host 502 based upon a context associated with root node 316 of social graph 114. In particular, the context associated with root node 316 can be determined based upon at least one of private information 414 or trusted information 412. In other words, while ad host 502 may not be privy to private or trusted information 412, 414, such information can be utilized to select the most suitable subset 504 of public information 410 with which to provide to ad host 502. For example, consider the case in which Ashley's calendar indicates that she is meeting Ross for a game of golf on Saturday at 9:00 am at the Fairway. Hence, host device 102 knows what, when, where, and with whom. Yet, all or most of this information might be desired to be kept from other parties such as ad host 502. However, the fact that Ashley has a friend who likes golf or the like might be designated as public information 410. Given that Ashley will soon be meeting Ross for golf, advertising component 116 knows the appropriate context and can therefore select the public portion as subset 504 for use by ad host 502 in selecting relevant group 506 in advance of the golf outing. It should be appreciated that selection of subset 504 can also be based upon express input from host device 102. For instance, Ashley might consciously decide to let ad host 502 know she is about to meet a friend for a game of golf.

It should therefore be appreciated that advertising component 116 can determine or infer subset 504 based upon public information that is suitable to ad host 502 for selecting a contextually relevant group 506 of advertisements. Subsequently, when advertising component 116 receives the contextually relevant group 506 (as set 118), advertising component 116 can then select or tailor custom ad 120 based upon at least one of trusted information 412 or private information 414 included in social graph 114. In addition, advertising component 116 can, e.g. at any contextually relevant moment, select custom ad 120 for display on host device 102.

Moreover, given the wealth of information available to host device 102 as well as the trusted nature of relationships described by social graph 114, advertising component 116 can select custom ad 120 for delivery (e.g., by communication component 104) to peer device 110 in a peer-to-peer (P2P) fashion. It should be appreciated that P2P transfers of custom ad 120 can be much more convenient from a networking perspective, given that conventional methods that transfer advertisements from the advertiser to the ad target must first have contact information, which tends to be very difficult for advertisers to obtain. In addition, as indicated previously, advertisers often lack the rich context necessary to accurately tailor ads. Moreover, P2P transfers provide an additional benefit to advertisers since the ad target is much more likely to devote attention to an ad received from a known individual as opposed to, e.g., an unsolicited ad from an advertiser.

In one or more aspects, advertising component 116 can further select feedback 508 for ad host 502 from public information 410 included in social graph 114. Appreciably, feedback 508 can include, e.g. a number of times custom ad 120 was rendered or delivered to one or more other peer devices 110. Feedback 508 can also include the particular content included in custom ad 120 or other indicia associated with the effectiveness of a rendered custom ad 120. The indicia associated with the effectiveness of a rendered custom ad 120 can be, e.g. a time when the custom ad 120 was rendered (e.g., was the ad displayed at lunchtime or during the middle of the night?); a duration for which custom ad 120 was displayed; a period between when custom ad 120 was rendered and recent use of an associated device (e.g., host or peer); an orientation (e.g. was the ad displayed while being held or in view of the operator?) or velocity (e.g. was the ad displayed while driving in a car, walking, or stationary?) of an associated device during which custom ad 120 was displayed; a photovoltaic reading (e.g. was the ad displayed while in an operator's pocket?) of the associated device during which custom ad was displayed; a state or setting of an associated device during which custom ad 120 was displayed (e.g., was the ad displayed while the device was on a battery charger, or the status of a setting to allow beeps or vibrations when ads are rendered?); or transformed or converted data or other information about the effectiveness of the ad. Naturally, feedback 508 can also be expressly provided by host device 102, such as in the case of ad ranking or the like.

Figure 6:
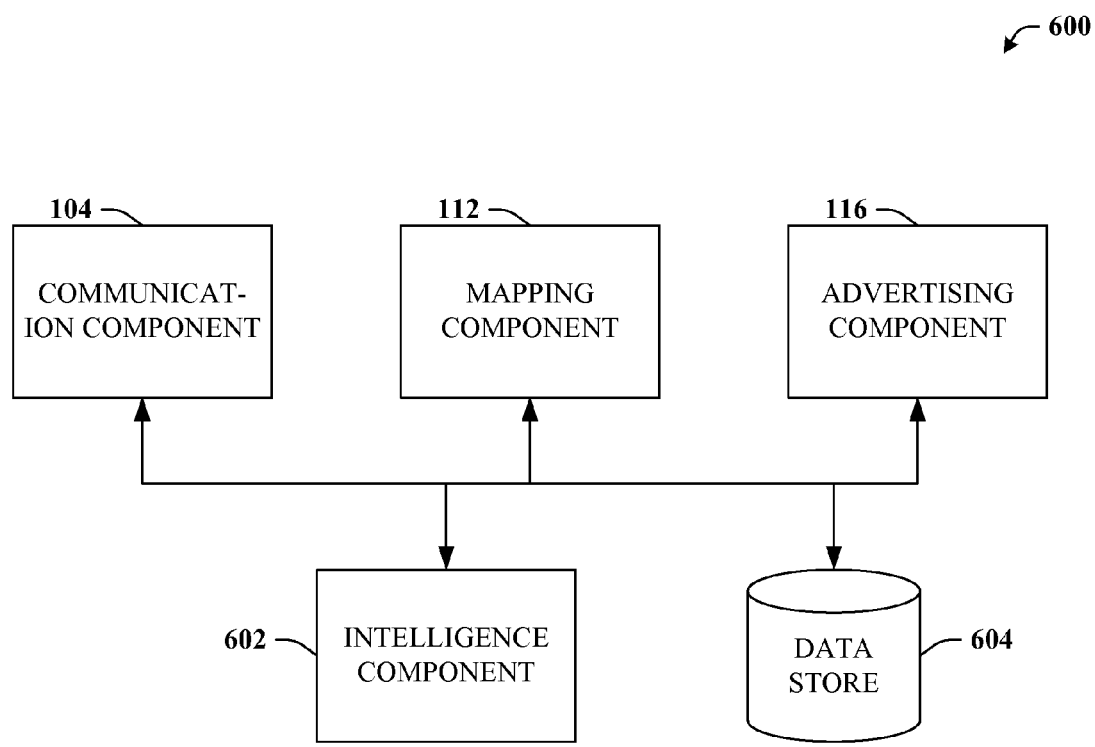
FIG. 6 is a block diagram of a computer-implemented system that can perform or aid with various determinations or inferences.

Now turning to FIG. 6, system 600 that can perform or aid with various determinations or inferences is illustrated. Generally, system 600 can include communication component 104, mapping component 112, and advertising component 116 as substantially described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences. For instance, communication component 104 can intelligently determine or infer suitable shared information 106, e.g., in connection with various recognition techniques, which themselves can rely upon intelligent determinations. Likewise, mapping component 112 can intelligently determine or infer when setting the threshold level for adding peer node 320 to social graph 114. Similarly, advertising component 116 can intelligently determine or infer subset 504 of public information 410 with which to provide to ad host 502. Of course, other examples are contemplated to exist.

In addition, system 600 can also include intelligence component 602 that can provide for or aid in various inferences or determinations. In particular, in accordance with or in addition to what has been described supra with respect to intelligent determination or inferences provided by various components described herein. For example, all or portions of communication component 104, mapping component 112, or advertising component 116 can be operatively coupled to intelligence component 602. Additionally or alternatively, all or portions of intelligence component 602 can be included in one or more components described herein. Moreover, intelligence component 602 will typically have access to all or portions of data sets described herein, such as data store 604. Data store 604 is intended to be a repository of all or portions of data, data sets, or information described herein or otherwise suitable for use with the claimed subject matter, and can potentially include other information stores or sources, such as social graph 114, sets or groups of advertisements (e.g., set 118 or group 504), or local data 302. Data store 604 can be centralized, either remotely or locally cached, or distributed, potentially across multiple devices and/or schemas. Furthermore, data store 604 can be embodied as substantially any type of memory, including but not limited to volatile or nonvolatile, sequential access, structured access, or random access and so on. It should be understood that all or portions of data store 604 can be included in system 100, or can reside in part or entirely remotely from system 100.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
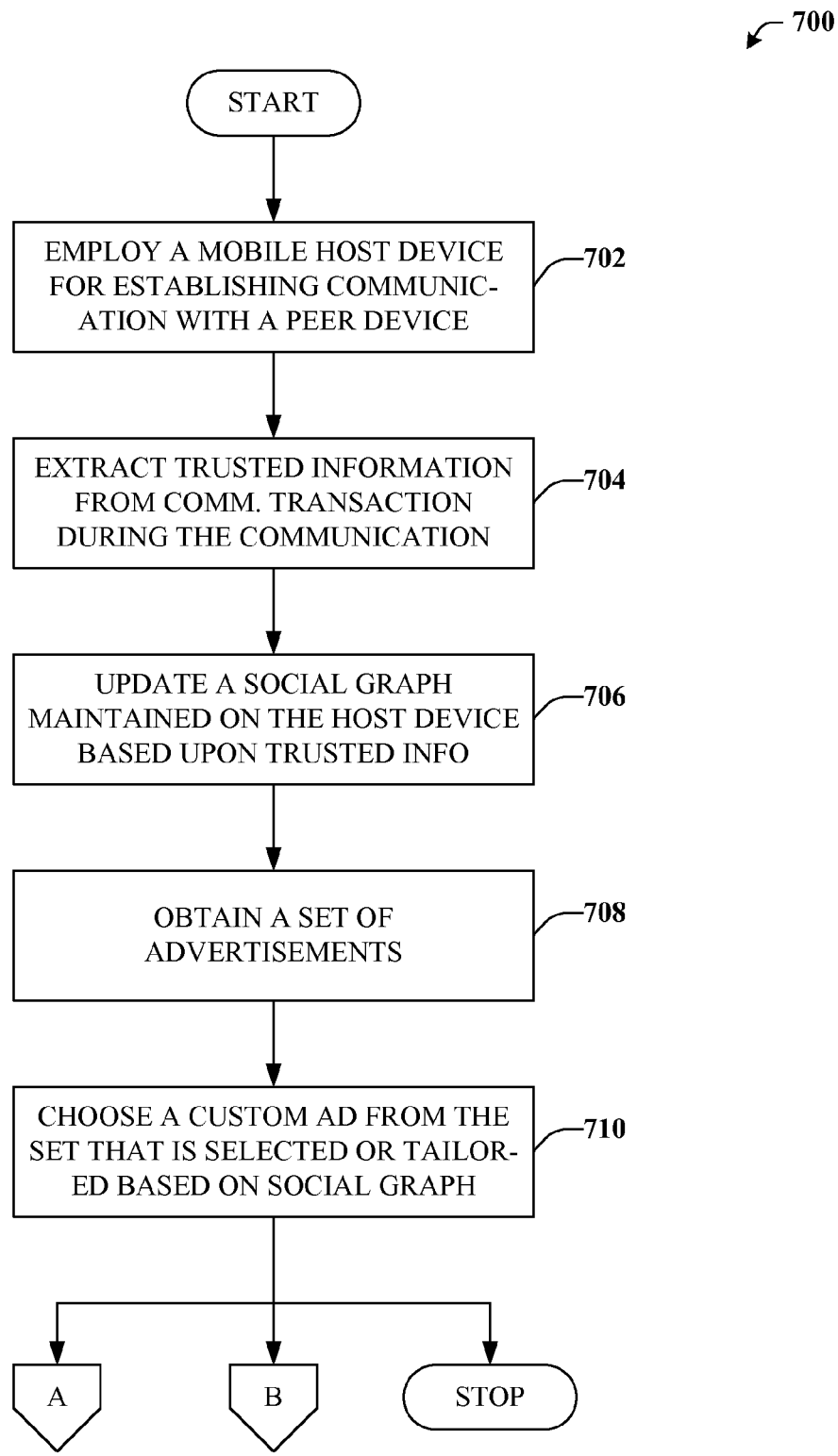
FIG. 7 depicts an exemplary flow chart of procedures that define a method for mitigating privacy concerns associated with data aggregation or customization in connection with ad targeting.
Figure 8:
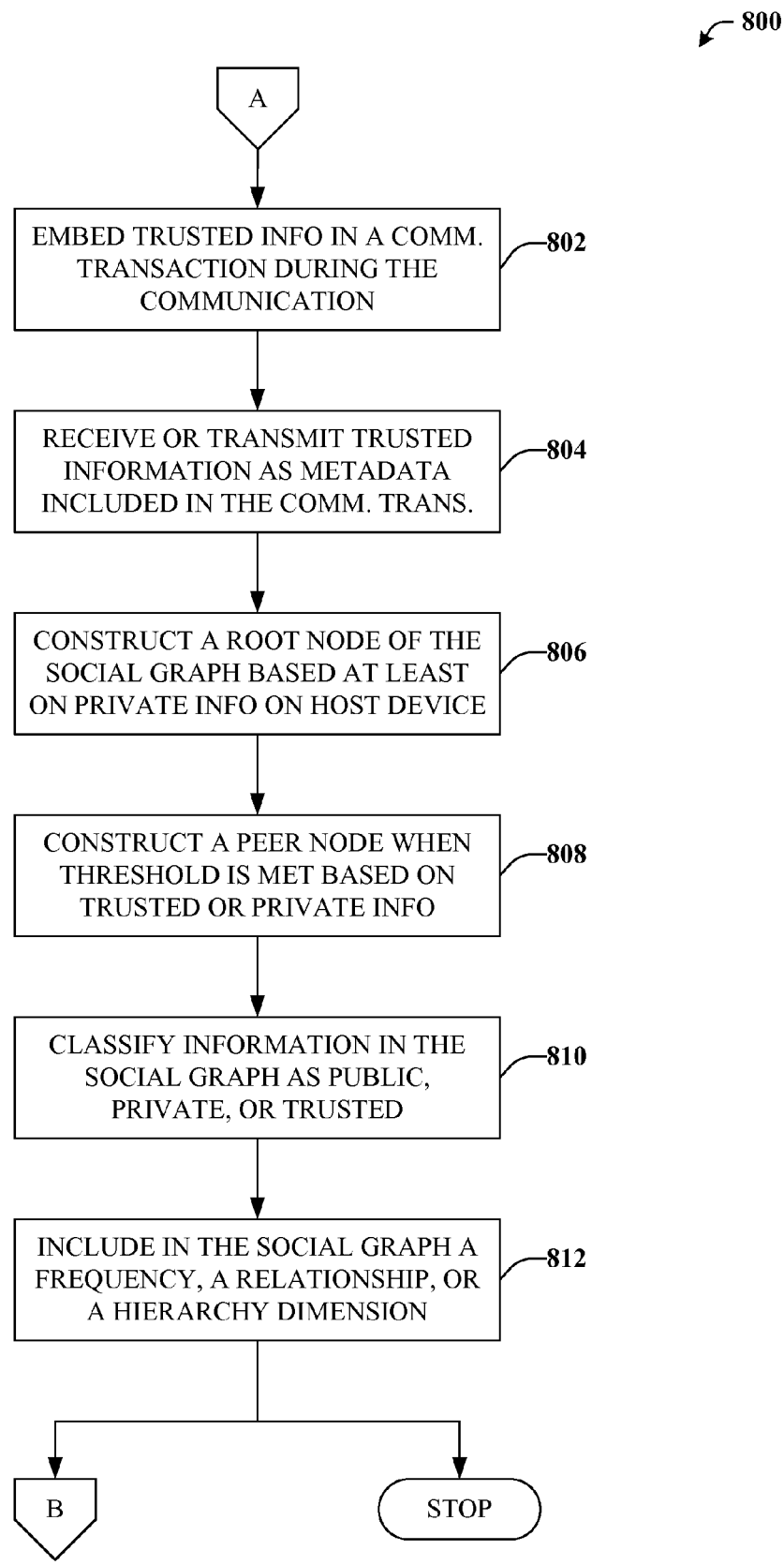
FIG. 8 illustrates an exemplary flow chart of procedures that define a method for disseminating shared information and/or constructing or organizing the social graph.
Figure 9:
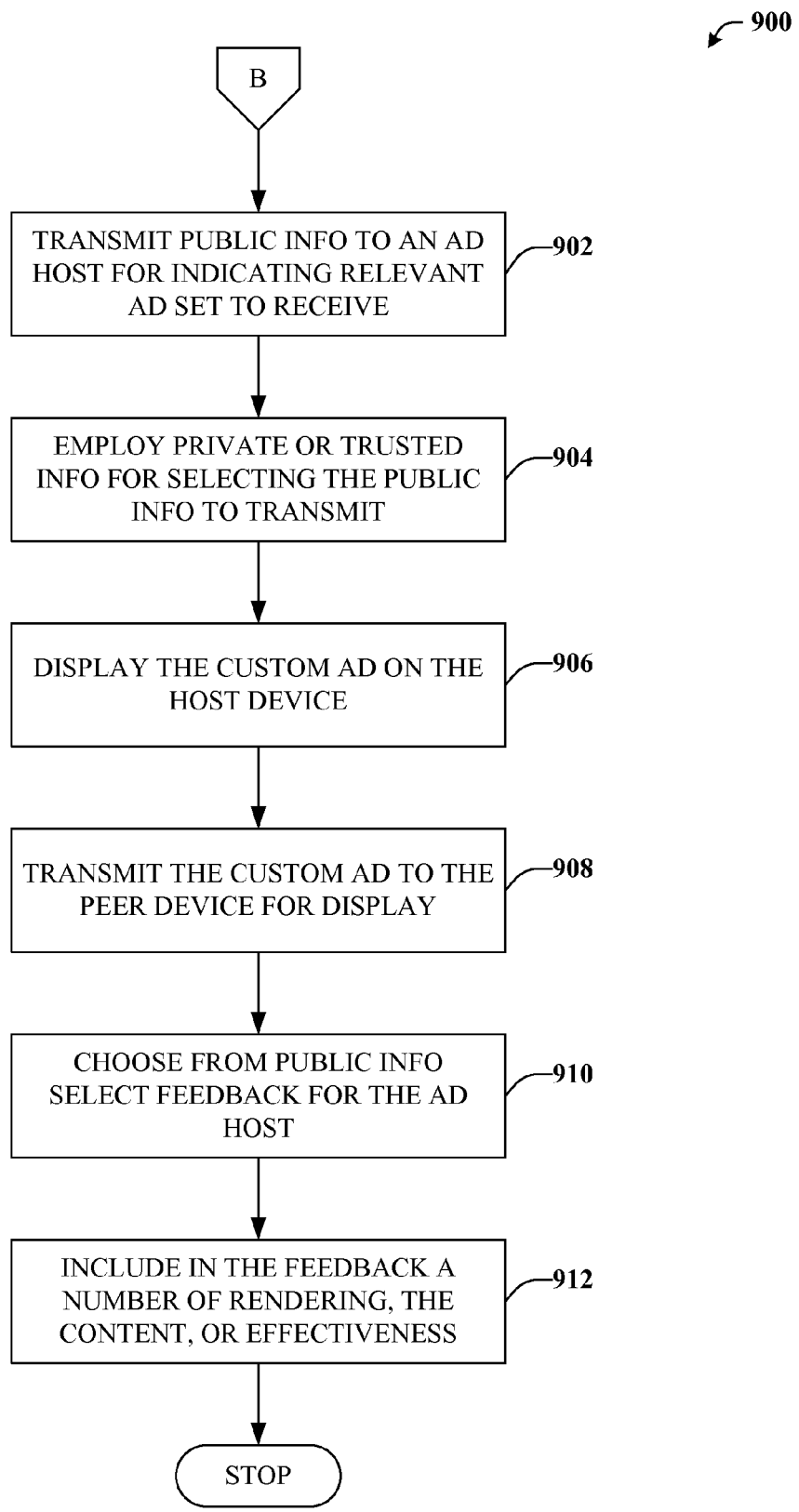
FIG. 9 is an exemplary flow chart of procedures defining a method for providing additional features in connection with customization of ads and/or feedback to an ad provider.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary method 700 for mitigating privacy concerns associated with data aggregation or customization in connection with ad targeting is illustrated. In general, at reference numeral 702, a mobile communication host device can be employed for establishing communication with a peer device. At reference numeral 704, shared information intended for the host device can be extracted from a communicative transaction between the host device and the peer device substantially during the communication. The communicative transaction can be, e.g., a phone call, a message, an email, or the like.

At reference numeral 706 a social graph maintained on the host device can be updated based upon the shared information received from the peer device. For instance, the shared information can relate to a peer social graph or portions thereof, location information or a history thereof, a purchase or transaction history, a browse history, a click history, an ad receipt history, a device use history, or a device status or history thereof.

Next to be described, at reference numeral 708, a set of advertisements can be obtained. For example, a large number of ads can be obtained from an advertiser, ad host, or another source. At reference numeral 710, a custom ad can be chosen from the set of advertisements received at reference numeral 708. The custom ad can be specifically selected or tailored based upon information included in the social graph, all of which can be accomplished in a privacy-centric manner.

Referring to FIG. 8, exemplary method 800 for disseminating shared information and/or constructing or organizing the social graph is depicted. At reference numeral 802, shared information intended for the peer device can be embedded in a communicative transaction between the host device and the peer device substantially during the communication. Thus, shared information can be provided to another party by embedding data in a communicative transaction as well as received from another party and extracted from the communicative transaction as detailed at reference numeral 704.

At reference numeral 804, shared information can be received or transmitted by the host device as metadata included in the communicative transaction. Turning to the social graph, at reference numeral 806, a root node of the social graph can be constructed based at least on private information included on the host device. This information can include, e.g., an address book, a contact list, a call log, a message log, other communication or transaction logs, a schedule or calendar, or a personal profile to name a few examples.

At reference numeral 808, a peer node of the social graph can be constructed when a communication threshold is satisfied. For instance, when a minimum number of communicative transactions occur between the host device and the associated peer device within a certain period of time, then the communication threshold can be satisfied and the peer node created. Appreciably, data included in the peer node can be based on private information or shared information included in or received by the host device.

At reference numeral 810, information included in the social graph can be classified as public information, private information, or trusted information. Generally, public information has no restrictions on dissemination beyond a trusted network defined by the social graph. On the other hand, trusted information can be restricted at least to the trusted network or a portion thereof, whereas private information is typically not disseminated at all or only available to the host device. At reference numeral 812, the social graph can be organized to include at least one of a frequency dimension (e.g., a frequency of communicative transactions), a relationship dimension (e.g., how a peer node is related to the root node such as friend, family, work . . . ), or a hierarchy dimension (e.g. N-order contacts such as friends of friends).

With reference now to FIG. 9, method 900 for providing additional features in connection with customization of ads and/or feedback to an ad provider is illustrated. For instance, at reference numeral 902, a select subset of public information can be transmitted to an ad host for indicating a contextually appropriate set of advertisements for the ad host to transmit to the host device. The contextually appropriate set of advertisements can be received as detailed in connection with reference numeral 708.

In addition, at reference numeral 904, private information or trusted information included in the social graph can be employed for selecting the subset of public information to transmit to the ad host. In other words, information that is not available to the ad host can still be utilized for choosing which data is provided to the ad host, e.g., in order to guide which set of ads for the ad host to select.

Furthermore, once the custom ad is selected as detailed in connection with reference numeral 710, at reference numeral 906, the custom ad can be displayed on the host device. Additionally or alternatively, at reference numeral 908, the custom ad can be transmitted to the peer device for display, for instance in a P2P manner.

At reference numeral 910, select feedback for the ad host in connection with the custom ad can be chosen from public information included in the social graph. At reference numeral 912, various indicia can be included in the feedback. As a few example illustrations, such indicia can be a number of times the custom ad was rendered, the content included in the custom ad, a time when the custom ad was rendered, a duration for which the custom ad was displayed, a period between when the custom ad was rendered and a recent user of an associated device, an orientation or velocity of an associated device during which the custom ad was displayed, a photovoltaic reading of the associated device during which the custom ad was displayed, or a stat or setting of an associated device during which the custom ad was displayed.

Figure 10:
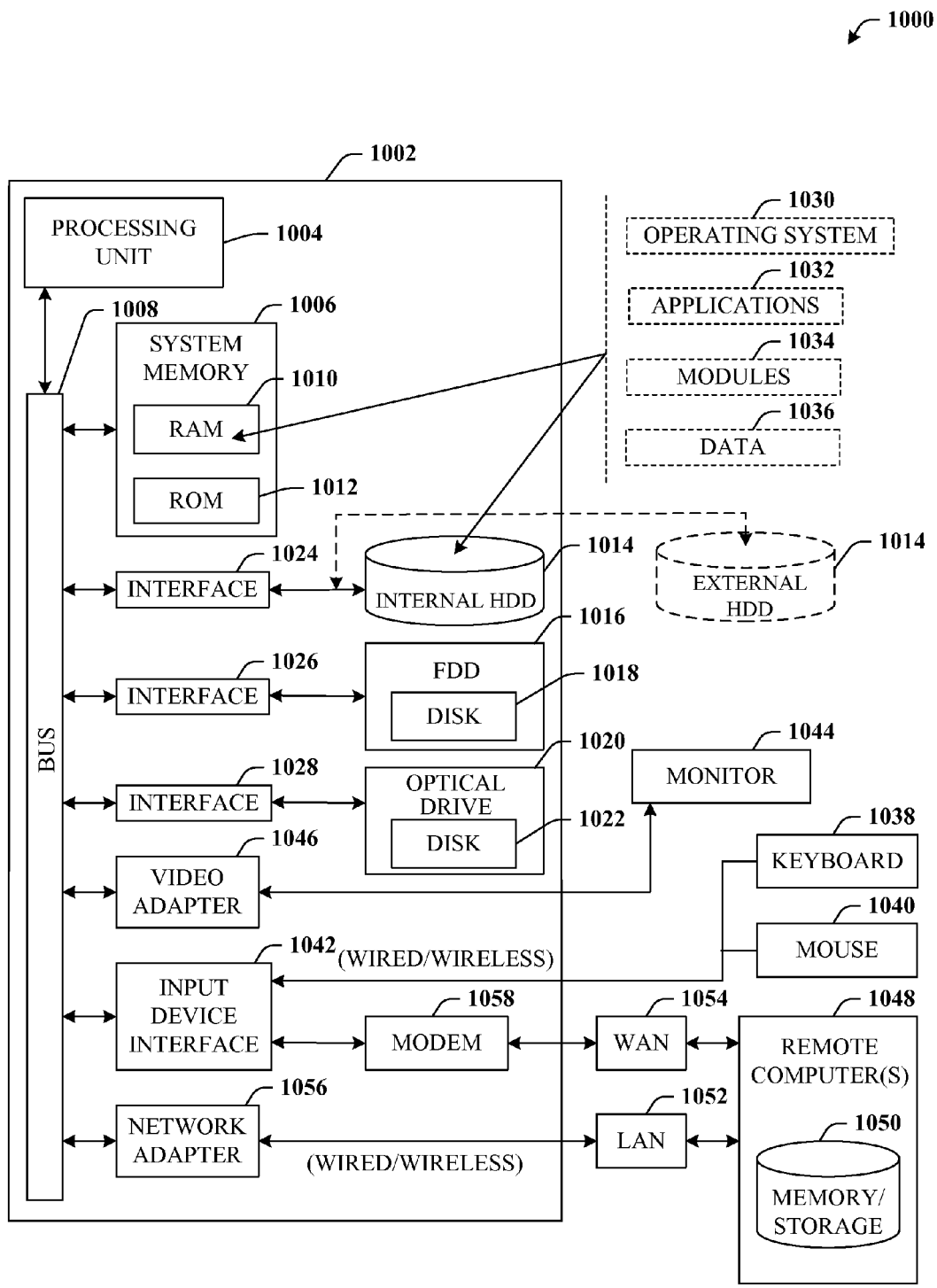
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
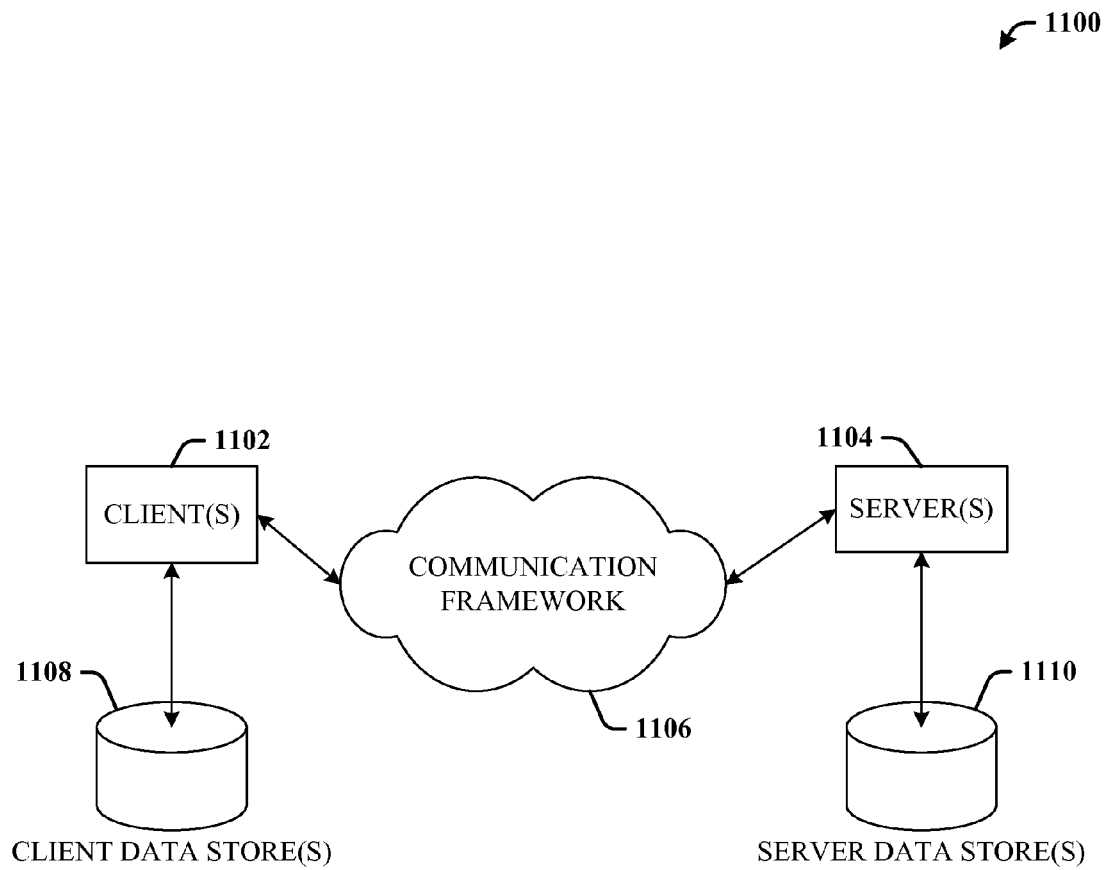
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that mitigates privacy concerns in connection with ad targeting or data collection, comprising:
   a mobile communication host device, comprising:
   a communication component that:
     1) receives a communication transaction between a mobile communication peer device and the host device, and
     2) extracts a first set of shared information from the content of the communication transaction between the host device and the peer device, the first set of shared information associated with the peer device;

a mapping component that:
(1) accesses a social graph stored locally on the host device, the social graph comprising at least: a) a root node including a host profile associated with the host device or a user thereof, and b) a peer node including a peer profile associated with the peer device or a user thereof, and
(2) updates the root node and the peer node by populating the root node and the peer node with the first set of shared information extracted by the host device;
an advertising component that receives a set of advertisements, stores the set of advertisements locally on the host device, and that selects or tailors a custom ad from the set based upon the updated social graph; and
a presenting component that presents the custom ad on the host device.

2. The system of claim 1, wherein the first set of shared information comprises at least metadata transmitted with the communication transaction between the host device and the peer device.

3. The system of claim 1, the communication component employs at least one of a voice recognition technique or a keyword recognition technique in order to extract the first set of shared information from the content of the communication transaction.

4. The system of claim 1, further comprising:
the communication component that:
extracts a second set of shared information from the content of the communication transaction between the host device and the peer device, the second set of shared information associated with the host device; and
transmits the second set of shared information associated with the host device to the peer device when authorized.

5. The system of claim 2, the communication transaction is at least one of a call, a text message, a media-based message, or an email; and the first set of shared information is at least one of a social graph or portions thereof determined from the content of the communication transaction, location information or a history thereof determined from the content of the communication transaction, a purchase history determined from the content of the communication transaction, a browse history determined from the metadata transmitted with the communication transaction, a click history determined from the metadata transmitted with the communication transaction, an ad receipt history determined from the metadata transmitted with the communication transaction, a device use history determined from the metadata transmitted with the communication transaction, or a device status or history thereof determined from the metadata transmitted with the communication transaction.

6. The system of claim 1, wherein the advertising component further selects or tailors the custom ad from the set based on at least one of (1) information that is stored entirely on the host device; (2) information that is not available to or not authorized for sharing with an advertiser, an ad host, a data center, or a third party; or (3) utilizing privacy-based or anonymity-based data transformations; and wherein the local data includes at least one of an address book, a contact list, a call log, a message log, a calendar, or a personal profile.

7. The system of claim 6, the call log or the message log includes at least one of a time, a frequency, a length/duration, or statistics relating to communication transactions.

8. The system of claim 7, the mapping component adds to the social graph a peer node associated with the peer device or a user thereof when a threshold level of communication transactions occurs between the host device and the peer device.

9. The system of claim 1, the social graph includes at least one of a frequency dimension that relates to a number of communication transactions that occur between the root node and a peer node, a relationship dimension that relates to a social classification or status between the root node and the peer node or operators thereof, or a hierarchy dimension that relates to a degree of separation between the root node and the peer node or operators thereof.

10. The system of claim 1, the mapping component classifies information included in the social graph into a distinct access category, the distinct access category is one of public information, which has no restriction on dissemination beyond a trusted network defined by the social graph; trusted information in which dissemination is restricted at least to the trusted network defined by the social graph or a portion thereof; or private information that is not disseminated and is only available to the host device; or the mapping component employs a transformation to convert trusted or private information into public information.

11. The system of claim 1, the advertising component examines public information included in the social graph and transmits a subset of the public information to an ad host that provides the set of advertisements to the advertising component.

12. The system of claim 11, the advertising component selects the subset of public information to be shared with the ad host based upon a context associated with the root node of the social graph; the context associated with the root node is determined based upon at least one of private information or trusted information.

13. The system of claim 11, the advertising component determines or infers the subset based upon public information that is suitable to the ad host for selecting a contextually relevant group of advertisements; the advertising component receives the contextually relevant group of advertisements from the ad host as the set of advertisements and selects or tailors the custom ad based upon at least one of trusted information or private information included in the social graph, the custom ad is selected for display on the host device or for delivery by the communication component to the peer device.

14. The system of claim 1, the advertising component selects feedback for the ad host from public information included in the social graph.

15. The system of claim 14, the feedback includes a number of times the custom ad was rendered, the content included in the custom ad, or indicia associated with the effectiveness of a rendered custom ad; the indicia is at least one of a time when the custom ad was rendered, a duration for which the custom ad was displayed, a period between when the custom ad was rendered and recent use of an associated device, a recent purchase or related transaction, an orientation or velocity of an associated device during which the custom ad was displayed, a photovoltaic reading of the associated device during which the custom ad was displayed, or a state or setting of an associated device during which the custom ad was displayed.

16. A computer implemented method carried out by a server running on a processor for mitigating privacy concerns associated with data aggregation or customization in connection with ad targeting, comprising:
at a mobile communication host device:
establishing a communication with a peer device;
during the communication, the host device extracting shared information intended for the host device from the content of the communication;

accessing a social graph stored locally on the host device, the social graph comprising at least: a) a root node including a host profile associated with the host device or a user thereof, and b) a peer node including a peer profile associated with the peer device or a user thereof;

updating the root node and the peer node by populating the root node and the peer node with the shared information extracted from the content of the communication;

obtaining a set of advertisements;

storing the set of advertisements locally on the host device;

based on the updated social graph, choosing, using the processor, a custom ad from the set; and presenting the custom ad on the host device.

17. The method of claim 16, further comprising at least one of the following acts:

embedding a second set of shared information intended for the peer device in a second communicative transaction between the host device and the peer device;

transmitting the second set of shared information as metadata included in the second communicative transaction;

updating the root node of the social graph based at least on the second set of shared information private information;

updating, when a communication threshold is satisfied, the peer node of the social graph based at least on the second set of shared information included in or received by the host device;

classifying information included in the social graph as public information, private information, or trusted information; or including in the social graph at least one of a frequency dimension, a relationship dimension, or a hierarchy dimension.

18. The method of claim 16, further comprising at least one of the following acts:

transmitting a select subset of public information to an ad host for indicating a contextually appropriate set of advertisements for the ad host to transmit to the host device;

employing at least one of private information or trusted information for selecting the subset of public information to transmit to the ad host;

displaying the custom ad on the host device;

transmitting the custom ad to the peer device for display;

choosing from public information included in the social graph select feedback for the ad host in connection with the custom ad; or including in the feedback at least one of a number of times the custom ad was rendered or displayed, the content included in the custom ad, or indicia associated with the effectiveness of the rendered custom ad.

19. A system that facilitates sharing of potentially sensitive information among a trusted network in order to mitigate privacy concerns in connection with ad profiling, comprising:

a mobile communication host device, comprising:

a communication component that extracts shared information from the content of a communication transaction between the host device and a peer device;

a mapping component that:

(1) constructs a locally stored social graph based upon at least one communication log stored locally on the host device, the social graph comprising at least a root node including a host profile associated with the host device or a user thereof and a peer node including a peer profile associated with the peer device or a user thereof;

(2) classifies information included in the social graph as one of public information, trusted information, or private information; and (3) updates the social graph stored locally on the host device by populating the root node and the peer node with the shared information extracted from the content of the communication transaction between the host device and the peer device;

(4) an advertising component that receives a set of advertisements, stores the set of advertisements locally on the host device, and that selects or tailors a custom ad from the set based upon the updated social graph; and (5) a presenting component that presents the custom ad on the host device.

* * * * *